United States Patent [19]

Kearney et al.

[11] Patent Number: 5,011,599
[45] Date of Patent: Apr. 30, 1991

[54] SIMPLE SYSTEM FOR DECOMPOSING ATRAZINE IN WASTEWATER

[75] Inventors: Philip C. Kearney, Laurel; Mark T. Muldoon, Bowie; Cathleen J. Somich, Laurel, all of Md.

[73] Assignee: The United States of America as represented by the Secretary of Agriculture, Washington, D.C.

[21] Appl. No.: 479,804

[22] Filed: Feb. 13, 1990

Related U.S. Application Data

[62] Division of Ser. No. 220,181, Jul. 8, 1988, Pat. No. 4,915,842.

[51] Int. Cl.$^5$ .............................. C02F 1/78; C02F 3/04
[52] U.S. Cl. .................................... 210/130; 210/192; 210/195.1; 210/220; 210/259
[58] Field of Search ...................... 210/150, 192, 195.1, 210/196, 220, 258, 259, 611, 617, 631, 760, 909; 435/122, 128, 129, 147, 168, 262, 874

[56] References Cited

U.S. PATENT DOCUMENTS

| | | | |
|---|---|---|---|
| 524,865 | 8/1894 | Rafter | 210/617 |
| 2,141,979 | 12/1938 | Halvorson et al. | 210/617 |
| 3,779,909 | 12/1973 | Wisfeld et al. | 210/760 |
| 4,178,239 | 12/1979 | Lowther | 210/760 |
| 4,184,947 | 1/1980 | Demisch | 210/617 |
| 4,225,431 | 9/1980 | DeLonge | 210/760 |
| 4,415,658 | 11/1983 | Cook et al. | 210/909 |
| 4,678,582 | 7/1987 | Lavigne | 210/150 |
| 4,915,842 | 4/1990 | Kearney et al. | 210/631 |

OTHER PUBLICATIONS

R. C. Rice, "Ozone for Treatment of Hazardous Materials in Water," *A.I.Ch.E. Symp. Ser.*, No. 209, 77: 79–107 (1981).

P. C. Kearney et al., "UV-Ozonation of Paraquat," *J. Agric. Food Chem.*, 33:953–957 (1985).

P. C. Kearney et al., "Coumphos Disposal by Combined Microbial and UV-Ozonation Reactions," *J. Agric. Food Chem.*, 34: 702–706 (1986).

P. C. Kearney et al., "A Large Scale UV-Ozonation Degradation Unit: Field Trials on Soil Pesticide Waste Disposal," *ACS Symp. Ser.*, 259: 195–209 (1984).

P. C. Kearney et al., "Oxidative Pretreatment Accelerates TNT Metabolism in Soils," *Chemosphere*, 12 (No. 11/12): 1583–1597 (1983).

P. C. Kearney et al., "UV-Ozonation and Land Disposal of Aqueous Pesticide Wastes," *Proc. 5th Int. Congr. Pestic. Chem. IUPAC*, 4: 397–400 (1983).

A. M. Cook, "Biodegradation of S-Triazine Xenobiotics," *FEMS Microbiol Rev.*, 46: 93–116 (1987).

*Primary Examiner*—Stanley Silverman
*Assistant Examiner*—Christopher Upton
*Attorney, Agent, or Firm*—M. Howard Silverstein; Beverly K. Johnson; John D. Fado

[57] ABSTRACT

A hybrid chemical/biological process which is highly effective to destroy the herbicide, Atrazine, in wastewater solutions is herein disclosed. The process comprises subjecting the atrazine molecule in an aqueous carrier to ozone to produce the oxidized product, diamino-s-triazine and thereafter, metabolizing the diamine in soil having indigenous and selected microorganism capable of degrading the diamine to carbon dioxide. Also disclosed is a disposal system capable of preforming the process of the invention in a single system.

2 Claims, 2 Drawing Sheets

SIMPLE SYSTEM FOR DECOMPOSING ATRAZINE IN WASTEWATER

This application is a division of application Ser. No. 07/220,181, filed July 8, 1988, now U.S. Pat. No. 4,915,842.

BACKGROUND OF THE INVENTION

1. Field of the Invention

The present invention relates to treatments for the disposal of pesticides in wastewater. More particularly, this invention relates to a method for decomposing 2-chloro-4-(ethylamino)-6-(isopropylamino)-s-triazine, hereinafter referred to as "atrazine" in wastewater solutions.

2. Description of the Prior Art

Atrazine is one of the most widely used herbicides in the United States. Annual production was estimated at 35,913 metric tons in 1982. Atrazine has been detected in groundwater in the parts per billion (ppb) range.

Safe disposal of herbicide wastewater containing atrazine compounds, and compounds related thereto, is a major problem for the farmer, commercial applicator, or small-scale formulator. Improper herbicide wastewater disposal is a significant contributing factor to groundwater contamination. Consequently, there exists a need for a simple, low-cost, and versatile system for the disposal of atrazine which maybe used by the low-level herbicide user.

Wastewater disposal treatments currently being investigated in the United States include (1) rinsewater recycling; (2) granular carbon absorption; (3) UV-ozonation; (4) small-scale incineration; (5) solar photodecomposition; (6) chemical degradation; (7) evaporation, photodegradation and biodegradation in containment devices; (8) genetically engineered products; (9) leach fields; (10) acid and alkaline trickling filter systems; (11) organic matrix adsorption and microbial degradation; (12) and evaporation and biological treatment with wicks. Although most of these technologies are still in the experimental stage, they show little promise because they are costly and slow, often producing inconsistent results or having a limited applicability. Further, techniques such as wastewater volume reduction by rinsewater recycling and granular carbon absorption are disadvantageous because they require additional steps to decompose the pesticide or to recover carbon sources.

SUMMARY OF THE INVENTION

We have now developed a system which is highly effective to decompose atrazine in aqueous solutions. In accordance with the process of the invention, the destruction of atrazine is accomplished by ozonation of the atrazine molecule in an aqueous medium followed by microbial soil degradation of the ozonated product. The system of the invention is simple, economical and practical for the on-site degradation of atrazine in wastewater solutions, thereby preventing the movement of the herbicide into groundwater.

Accordingly, it is an object of the present invention to provide a process which is highly effective to decompose atrazine in aqueous wastewater solutions.

It is also an object of the invention to provide a simple and economical atrazine wastewater disposal system which is readily adaptable to the on-site disposal of the herbicide.

DETAILED DESCRIPTION OF THE INVENTION

Figure 1:
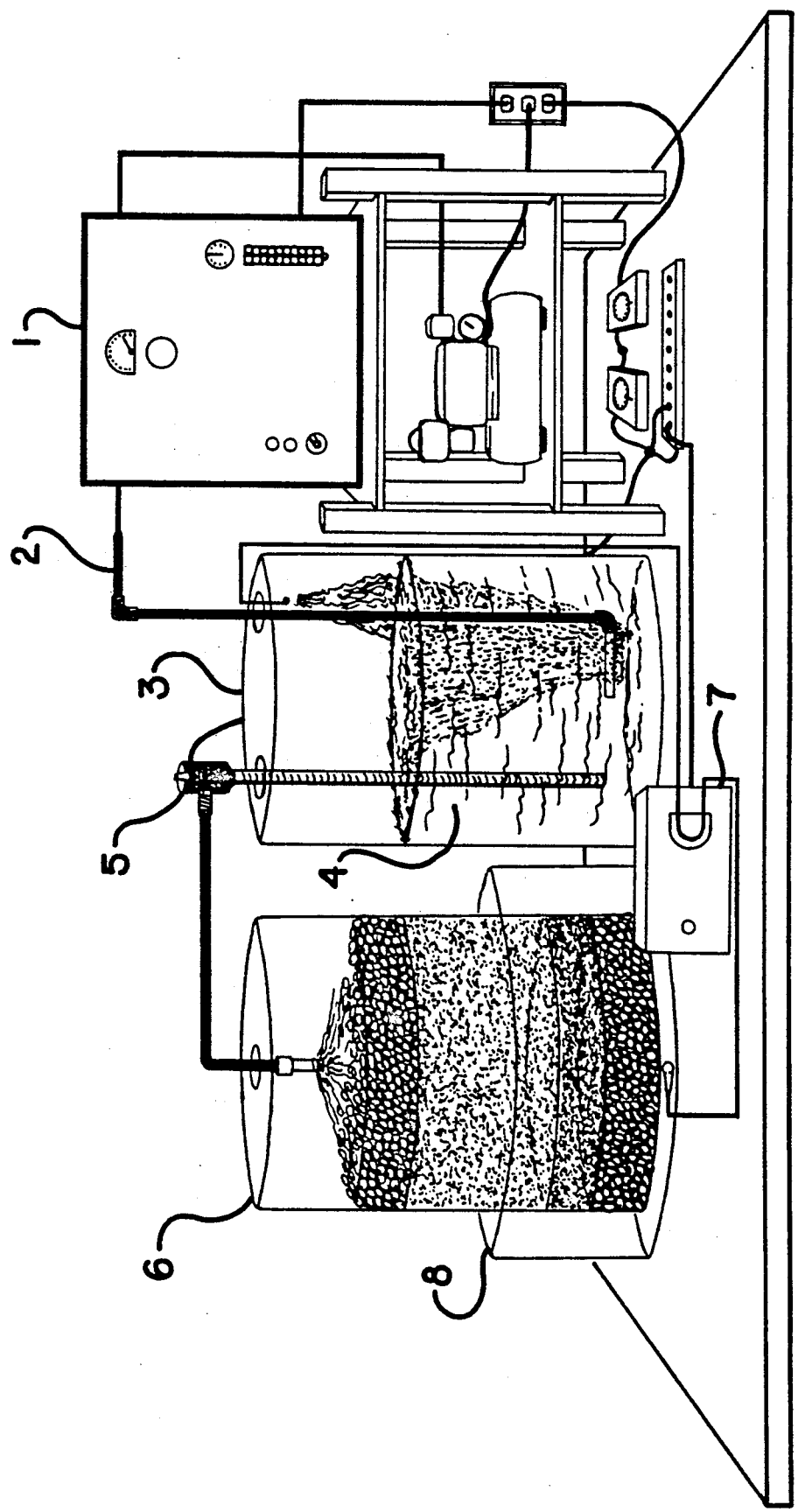
FIG. 1 shows a schematic view of a mobile, 2-step ozone generator/soil herbicide wastewater disposal system which is useful to degrade atrazine in aqueous solutions in a single system using the process of the invention.
Figure 2:
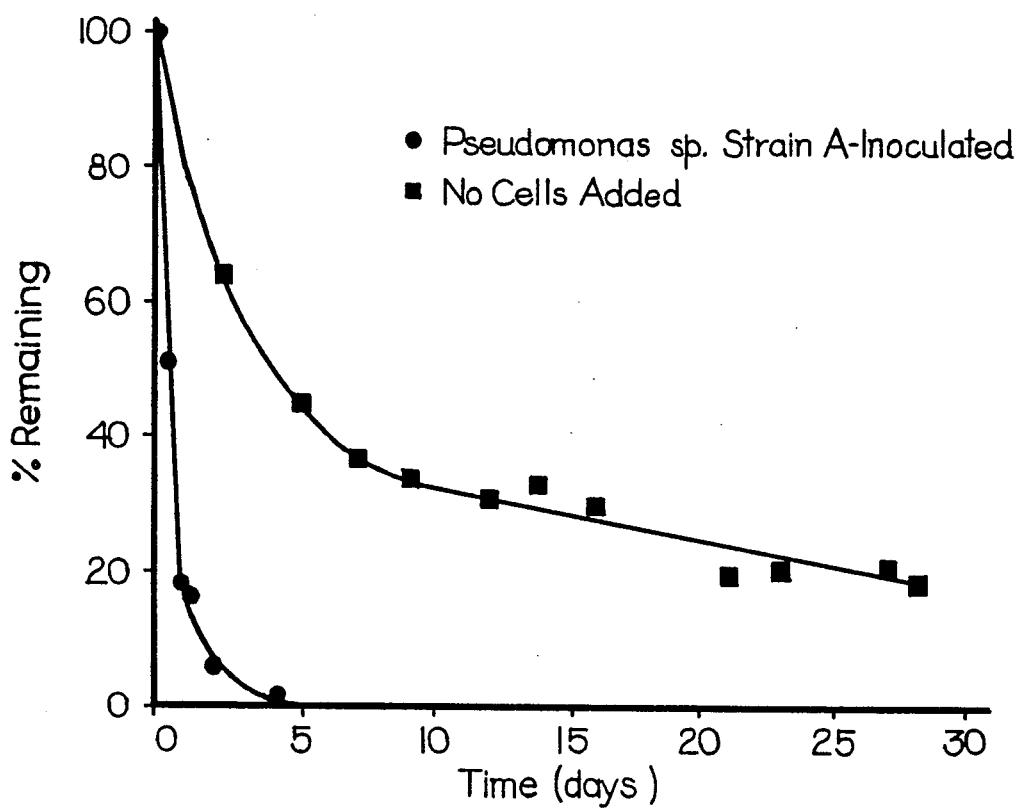
FIG. 2 outlines the metabolism of 2-chloro-4,6-diamino-s-triazine in a soil column not inoculated with and a soil column inoculated with *Pseudomonas sp.*, Strain A.
Figure 3:
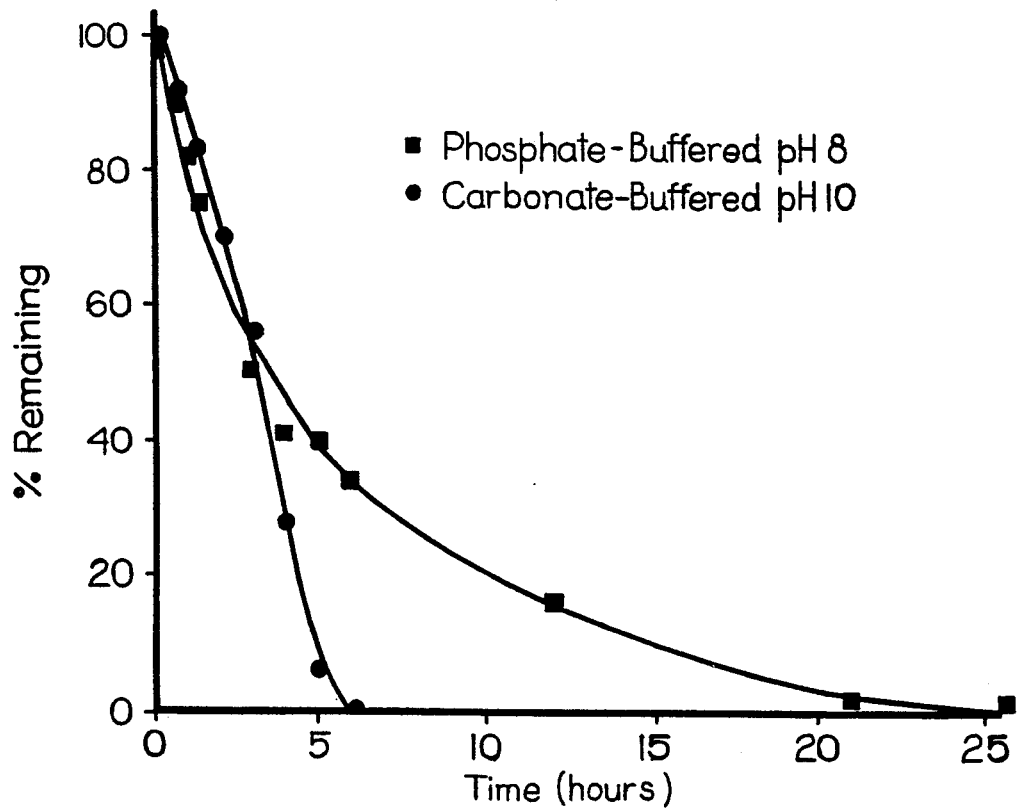
FIG. 3 outlines comparative rates of ozonation of atrazine in aqueous solutions buffered to pH 8 and pH 10, respectively.

In accordance with the process of the invention, atrazine is chemically oxidized with ozone to produce a more polar s-triazine molecule which is more susceptible to microbial metabolism than the unoxidized atrazine molecule. Ozonation of atrazine appears to proceed by the addition of oxgyen to the alkylamino group followed by dealkylation to form the diamino-s-triazine molecule, i.e. 2-chloro-4,6-diamino-s-triazine. Subsequently, the diamino-s-triazine molecule is metabolized using a selected soil microorganism, i.e. a bacterium of the genus Pseudomonas, to the dihydroxy compound which spontaneously dechlorinates. The resulting cyanuric acid is readily metabolized to carbon dioxide and ammonia by indigenous microorganisms present in organic soils. The proposed mechanism for the process of the invention is as follows:

STEP 1 - OZONATION

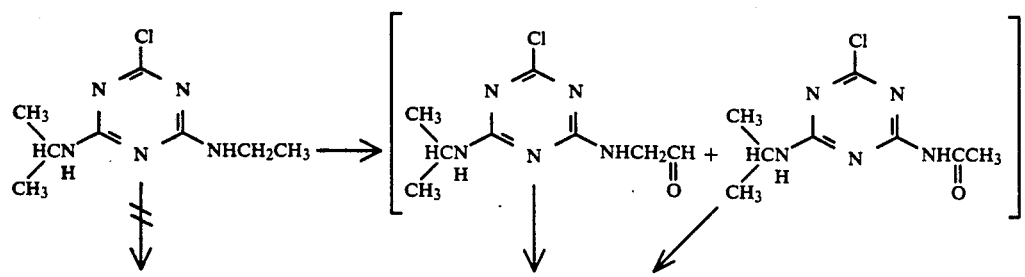

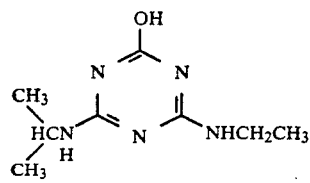
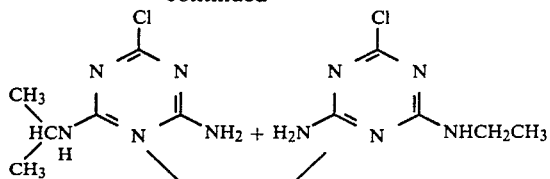

STEP 2 - SOIL METABOLISM

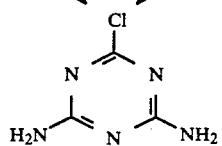

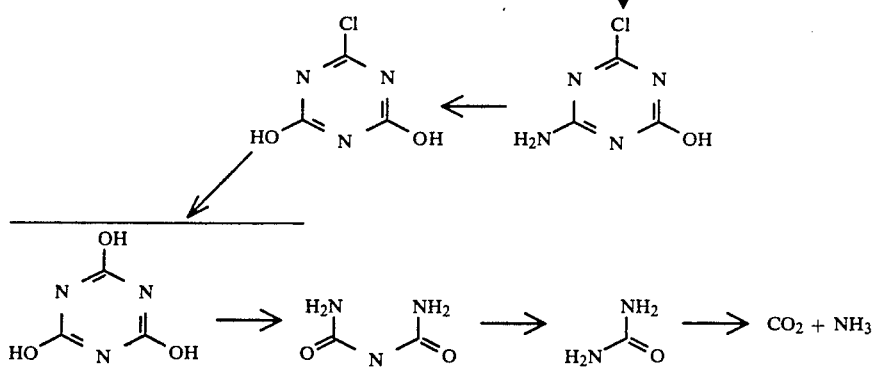

The amount of ozone useful in the invention process is any amount sufficient to dealkylate the atrazine molecule. As will be obvious to one skilled in the chemical arts, the rate of oxidation wil be determined by the rate-determining step, i.e., the rate of transfer of gaseous ozone into the aqueous phase. Consequently, the rate of oxidation will vary depending upon such factors as (1) the amount of organic materials dissolved in the aqueous solution; (2) the concentration of ozone used; (3) the gas pressure used during ozonation; (3) the reaction temperature; (4) the degree or rate of mixing of the reaction mixture; (5) the bubble size of ozone gas; (6) the contact time between the ozone gas and the wastewater solution; and (7) and the like. For example, to provide sufficient contact time between the ozone gas bubble and the herbicide wastewater solution, the water depth should be within the range of about 0.9 to 5.5 meters. To preserve ease of movement of the decontaminating devise, the water depth of the reaction vessel is preferably 0.9 to 2.0 meters.

To further enhance the rate of oxidation in the invention process, the pH of the wastewater solution maybe adjusted to about pH 8 to pH 10.8, preferably about pH 10 to 10.8. The rate of oxidization may also be accelerated by the addition of hydrogen peroxide ($H_2O_2$) to the herbicide wastewater solution. Preferably, hydrogen peroxide is added in an amount of from about 20 to 100 mg/l.

Metabolism of the 2-chloro-4,6-diamino-s-triazine is accomplished in a organic-rich soil, i.e. a soil consisting of from about 10 to 20 percent of organic matter, inoculated with a bacterium of the genus Pseudomonas, preferably Pseudomonas sp., Strain A or Pseudomonas sp., Strain D. Strain A and Strain D maybe obtained from the culture collection at the North Regional Research Center, U.S. Department of Agriculture, Peoria, Ill., 61604 under the accession numbers NRRLB-12227 and NRRLB-12228, respectively. Growth conditions and nutrient requirements for Strain A and Strain D were the same as described in Cook, A. M., "Biodegradation of s-triazine xenobiotics", *FEMS Microbiol. Rev.*, 46: 93-116 (1987).

The process of the invention is preferably accomplished using the wastewater disposal system as shown in FIG. I. In general, the system comprises a means 1 for generating ozone; a reaction vessel 3 operatively associated with said means for generating ozone; a biologically-active soil column 6 operatively associated with said reaction vessel; and a means 8 for collecting the biodegraded, pre-ozonated products exiting from the system. The disposal system further comprises a means 2 for dispersing ozone within the wastewater solution 4 in the reaction vessel, and a means 5 for transporting the ozonated wastewater solution from the reaction vessel to the soil column. Optionally, the decontamination unit as shown in FIG. I provides a means 7 for recirculating treated atrazine wastewater solution within the decontamination unit for successive treatments.

The invention is further demonstrated by the following example which is intended only to further illustrate the invention and not to limit the scope of the invention as defined by the claims.

EXAMPLE I

The effectiveness of the hybrid chemical-biological process of the invention to degrade atrazine in aqueous solution was demonstrated. The two step process was performed in a single system using the device as shown in FIG. I.

Atrazine was obtained from CIBA-GEIGY Corp., Greensboro, North Carolina 27419 under the tradename "Aatrex" which contains 480 g/L of pure atrazine.

23.75 ml of Aatrex (containing 480 mg atrazine/mL) was added to 114 L of tap water resulting in a 100 mg/L atrazine solution. 555 g of sodium carbonate monohydrate (4.5 moles) was added to the atrazine solution and the solution was mixed by stirring. The pH of the solution was 10.8. Ozonation was carried out at maximum ozone output. The ozone generator was operated at 4 Amps, 10 PSI, and an air flow of 25-30 SCFH producing ozone at a rate of approximately 600 mg/min. The reaction was carried out until 2-chloro-4,6-diamino-s-triazine accumulated. This occurred at 12 hours as determined by high pressure liquid chromatography.

The ozonated solution was adjusted to pH 7.2 by the addition of 600 ml of concentrated hydrochloric acid. The solution was supplemented with 4 L of a 0.5M solution of potassium phosphate buffer, pH 7, resulting in 17 mM potassium phosphate. 615.6 g of succinate was added resulting in approximately 20 mM succinate. The solution was also supplemented with trace metals.

Soil metabolism was conducted in a Sassafras silt loam (14% organic matter, pH 4.2, sand silt and clay contents of 56%, 20% and 24%, respectively, and a moisture content of 57% at ⅓ bar) obtained from Salisbury, Md. A soil column was preconditioned by circulating 114 L of 20 mM phosphate buffer pH 7 for 48 hours at an initial rate of 1 L/minute. Following equilibration, the buffer was removed and replaced with 114 L of 20 mM phosphate buffer pH 7 containing 10 mM lactate, 1.5 mM ammonium sulfate, and trace metals as described in Cook and Hutter (1981). 2 L of Pseudomonas sp. Strain A ($2.75 \times 10^{11}$ CFU/ml) were added to the soil column and allowed to circulate for 48 hours prior to the addition of a second inoculum of 2 L of Pseudomonas sp. Strain A containing $1.5 \times 10^{12}$ CFU/ml. The second inoculum was allowed to circulate for 24 h prior to the addition of the ozonated atrazine.

CFU's were calculated by streaking dilutions of the inoculi on purified agar plates containing 10 mM phosphate buffer pH 7, 10 mM succinate and 0.5 mM ammelide allowing for 48 hours growth at 37° C. and counting CFU's on the plate. No attempts were made to calculate the rate and/or extent of colonization in the soil column. The control was circulated through a soil column not preconditioned nor inoculated with Pseudomonas sp. Strain A.

The 114 L of ozonated atrazine solution was fortified to 20 mM succinate and trace metals prior to addition and circulation through the soil column. The solution was continuously circulated through the soil column at a flow rate of 9-10 L/hour using a drum pump for application and a peristaltic pump to return the solution to the reaction vessel. The solution in the reaction vessel was continuously aerated using the oilles air compressor as an air source. The solution was circulated through the soil column until no s-triazine could be detected by HPLC. Results are recorded in FIG. II.

Microbial metabolism of ozonated atrazine in soil inoculated with Pseudomonas sp., Strain A was very rapid. As shown in FIG. II, essentially over 90% of chlorodiamino-s-triazine of ozonated atrazine was degraded after 4 days. Indigenous soil microorganisms degraded the ozonated atrazine more slowly achieving only about 25% degradation after 28 days.

EXAMPLE II

The effect of pH to enchance the rate ozonation of atrazine was demonstrated.

Ozonation was carried out using the procedure as described in Example 1 using 2 samples of 100 mg/L of formulated solution of atrazine. The samples were respectively buffered at pH 8.0 and pH 10. The loss of atrazine was measured in accordance with the procedure in Example I. Results are recorded in FIG. III.

As shown in FIG. III, more than 99% loss of the parent atrazine molecule occurred in 6 hours at pH 10, while the same loss level was achieved at 26 hours at pH 8.

It is understood that modifications and variations may be made to the foregoing disclosure without departing from the spirit and scope of the invention.

We claim:

1. An atrazine wastewater disposal system, comprising:
    means for producing 2-chloro-4,6-diamino-s-triazine from atrazine in an aqueous carrier solution by ozonating the atrazine; and,
    an organic-rich soil connected with the producing means for degrading the 2-chloro-4,6-diamino-s-triazine, the soil containing microorganisms capable of metabolizing the 2-chloro-4,6-diamino-s-triazine, the microorganisms comprising Pseudomonas sp. Strain A.

2. An atrazine wastewater disposal system, comprising: means for producing 2-chloro-4,6-diamino-s-triazine from atrazine in an aqueous carrier solution by ozonating the atrazine; and, an organic-rich soil connected with the producing means for degrading the 2-chloro-4,6-diamino-s-triazine, the soil containing microorganisms capable of metabolizing the 2-chloro-4,6-diamino-s-triazine, the microorganisms comprising Pseudomonas sp. Strain D.

* * * * *